United States Patent

Teramoto et al.

[11] Patent Number: 5,451,438
[45] Date of Patent: Sep. 19, 1995

[54] ACYLAMIDOMETHYLATED POLYSULFONE AND PROCESS FOR PRODUCTION THEREOF

[75] Inventors: Kazuo Teramoto; Naoto Hokari, both of Kamakura, Japan

[73] Assignee: Biomaterial Research Institute Co., Ltd., Japan

[21] Appl. No.: 170,227

[22] PCT Filed: Oct. 28, 1993

[86] PCT No.: PCT/JP93/01564

§ 371 Date: Dec. 28, 1993

§ 102(e) Date: Dec. 28, 1993

[87] PCT Pub. No.: WO94/10226

PCT Pub. Date: May 11, 1994

[30] Foreign Application Priority Data

Oct. 28, 1992 [JP] Japan ............................ 4-311147
Dec. 25, 1992 [JP] Japan ............................ 4-357775
Mar. 25, 1993 [JP] Japan ............................ 5-89539

[51] Int. Cl.$^6$ .......................................... C08G 75/20
[52] U.S. Cl. ................................ 428/357; 525/534; 525/906
[58] Field of Search ................ 525/534, 906; 428/357

[56] References Cited

U.S. PATENT DOCUMENTS 4,340,714  7/1982  Schupp et al. .................... 525/38
4,952,608  8/1990  Klipper et al. ................... 525/375

FOREIGN PATENT DOCUMENTS 51-8179    1/1976   Japan .
57-174104  10/1982  Japan .
62-42704   12/1987  Japan .
63-16204A  1/1988   Japan .
63-189402  8/1988   Japan .
2014203    1/1990   Japan .
3-109438   5/1991   Japan .
3-115407   5/1991   Japan .
4-218532   8/1992   Japan .
4-234434   8/1992   Japan .
5-209368A  8/1993   Japan .
5-228351A  9/1993   Japan .
5-230760A  9/1993   Japan .

OTHER PUBLICATIONS

"Chemical Modifications of Polystyrene Surfaces by Amidomethylation Reaction with N–methylol-2–chloroacetamide," Kazuo Teramoto, *Reactive Polymers*, vol. 15, pp. 89–101 (1991).

"Sulfonated Polysulfone", A. Noshay, L. M. Robeson––Journal of Applied Polymer Science, vol. 20, pp. 1885–1903 (1976).

"Halomethylated Polysulfone: Reactive Intermediates to Neutral and Ionic Film–Forming Polymers", A. Warshawsky et al–Journal of Polymer Science: Part A: Polymer Chemistry, vol. 28, pp. 2885–2905 (1990).

Warshawsky et al. J. Polym. Sci: Part A: Polym. Chem., 28, 2885–2905 (1990).

"Streaming Potential of Microporous Membranes Made from Homogeneously Functionalized Polysulfone," Ekkehard Hinke and Eberhard Staude, *Journal of Applied Polymer Science*, vol. 42, pp. 2951–2958 (1991).

Primary Examiner—George F. Lesmes
Assistant Examiner—Helen F. Lee
Attorney, Agent, or Firm—Austin R. Miller

[57] ABSTRACT

An aromatic polysulfone polymer, and a molded article thereof, having an aromatic nucleus to which is introduced a group having the following general formula (I):

$$A-CH(R^1)-CO-N(R^2)-CH_2- \quad (I)$$

wherein, A is a halogen atom, hydroxyl group, amino compound residual group, acyloxyl group, alkoxyl group, phenoxyl group, or sulfide group, $R^1$ and $R^2$ are a hydrogen atom or lower alkyl group, and $R^1$ and $R^2$ may be the same or different to a main chain of aromatic polysulfone as a side chain.

9 Claims, No Drawings

ACYLAMIDOMETHYLATED POLYSULFONE AND PROCESS FOR PRODUCTION THEREOF

TECHNICAL FIELD

The present invention relates to an aromatic polysulfone polymer having an aromatic nucleus to which an acylamidomethyl group with a halogen atom, hydroxyl group, amino compound residual group, acyloxyl group, alkoxyl group, steroid residual group, or sulfide group is introduced as a side chain, a molded article thereof, and a process for production thereof, more specifically, it relates to an acylamidomethylated aromatic polysulfone polymer capable of being suitably used for the absorption, separation, immobilization, etc. of ionic substances, bioactive substances, etc., a shaped article thereof, and a process for production thereof.

BACKGROUND ART

Heretofore, specific bioactive substances, etc. immobilized to an insoluble carrier have been widely used as adsorbents for affinity chromatography, therapeutic blood treatment agents, cell culturing equipment, antibiotic materials, analytical reagents, etc. This is an important field in which further broader applications may be expected in the future.

Polymers having reactive functional groups are usable for immobilization of bioactive substances, which are useful as materials for affinity chromatography adsorbents, therapeutic blood treatment agents, antibiotic materials, etc. As a polymer having reactive functional groups, derivatives of polystyrene are well known, but these are brittle polymers and therefore, there are limits to their molding. For example, they have the defect that they cannot be molded into hollow fibers or catheters.

Aromatic polysulfones are good in moldability, and therefore, are widely used as engineering plastics. Some are also used in the form of hollow fibers for applications for separating substances. If reactive functional groups are introduced to this polysulfone, the product can be used for immobilization of bioactive substances, the selective separation of substances, etc. and broader applications can be expected.

Reactions for introducing reactive functional groups to a polysulfone, however, are not much known. There are only a few examples, such as a sulfonating reaction (A. Noshay, L. M. Robeson, Journal of Applied Polymer Science, 20, 1885 (1976)) and a halomethylating reaction (Japanese Unexamined Patent Publication (Kokai) No. 51-8179, Japanese Unexamined Patent Publication (Kokai) No. 57-174104, Japanese Unexamined Patent Publication (Kokai) No. 62-42704, Japanese Unexamined Patent Publication (Kokai) No. 63-16204, A. Warshawsky et. al., Journal of Polymer Science, Part A, Polymer Chemistry, 28, 2885 (1990)), etc. There are only limited applications for the former (sulfonation), while the latter (halomethylation), which is expected to provide broad applications, has the defect of requiring the use of a dangerous, highly carcinogenic reagent (i.e., alkylhalomethyl ether). Further, the reactivity of the functional groups is too high and the chemical stability is poor. In addition, it is difficult to control the amount of the functional groups introduced.

DISCLOSURE OF THE INVENTION

One object of the present invention is to provide a soluble novel acylamidomethylated aromatic polysulfone polymer, and a molded article using the same, useful as a material for absorption, separation, immobilization, etc. of ionic substances or bioactive substances.

Another object of the present invention is to provide a process for the production of the above-mentioned haloacetamidomethylated aromatic polysulfone polymer, and a molded article thereof, by the use of a specific haloacetamidomethylating agent, and a process for the production of a novel acylamidomethylated aromatic polysulfone polymer, or a molded article thereof, using this haloacetamidomethylated aromatic polysulfone polymer as a manufacturing intermediate.

In accordance with the present invention, there are provided an aromatic polysulfone polymer, and a molded article thereof, having an aromatic nucleus to which is introduced a group having the following general formula (I):

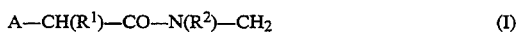

$$A—CH(R^1)—CO—N(R^2)—CH_2 \qquad (I)$$

wherein, A is a halogen atom, hydroxyl group, amino compound residual group, acyloxyl group, alkoxyl group, phenoxyl group, or sulfide group, $R^1$ and $R^2$ are a hydrogen atom or lower alkyl group, and $R^1$ and $R^2$ may be the same or different to a main chain of aromatic polysulfone, as a side chain.

As the aromatic polysulfone, there may be preferably mentioned poly(p-phenylene ether sulfone) or Udel polysulfone. As the side chain substituent group A, a cyclic polypeptide having two or more amino groups, a group having asteroid skeleton, or a group containing an aldehyde group is preferable.

The shape of the molded article may be, for example, a dish, bottle, film, fiber, hollow fiber, granules, or combinations using the same.

Note that the aromatic polysulfone having the above-mentioned side chain introduced thereto is preferably a soluble one.

In accordance with the present invention, there are provided a process for production of an aromatic polysulfone polymer, or a molded article thereof, comprising the following technical means:

1. A process for the production of an aromatic polysulfone and molded article thereof comprising allowing an aromatic polysulfone polymer or molded article thereof to react in the presence of an acid catalyst with a haloacetamidomethylating agent having the following general formula (II):

$$X—CH(R^1)—CO—N(R^2)—CH_2—O—Y \qquad (II)$$

wherein, X is a halogen atom, $R^1$ and $R^2$ are a hydrogen atom, lower alkyl group, or benzyl group, $R^1$ and $R^2$ may be the same or different, and Y is a hydrogen atom or lower alkyl group or acyl group.

2. A process for the production of the above polymer and a molded article thereof comprising bringing an aromatic polysulfone polymer having a haloacetamidomethyl group and a molded article thereof into contact with an amino compound.

3. A process for the production of the above polymer and a molded article thereof comprising bringing an aromatic polysulfone polymer having a haloacetamidomethyl group and a molded article thereof into contact with a carboxylic acid in the presence of a base.

4. A process for the production of the above polymer and a molded article thereof comprising bringing an aromatic polysulfone polymer having a haloacetamidomethyl group and a molded article thereof into contact with a hydroxyl group compound in the presence of a base.

5. A process for the production of the above polymer and a molded article thereof comprising bringing an aromatic polysulfone polymer having a haloacetamidomethyl group and a molded article thereof into contact with a thiol compound in the presence of a base.

BEST MODE FOR CARRYING OUT THE INVENTION

The present invention will now be described in further detail.

The present inventors, in consideration of the above-mentioned problems in the prior art, engaged in various studies to see if an aromatic polysulfone to which a useful reactive functional group is introduced could be obtained by a simple method and, as a result, succeeded in preparing a soluble haloacetamidemethylated polysulfone having reactive characteristics by the utilization of the amidomethylation reaction method using N-methylol-α-chloroacetamide, thereby reaching the present invention.

The aromatic polysulfone polymer having an aromatic nucleus to which the group represented by general formula (I) is introduced, as a side chain, referred to in the present invention, may be any polysulfone polymer having an aromatic nucleus and sulfonyl group as the main chain in which part of the aromatic nucleus is substituted by the group represented by the general formula (I) and is not particularly limited.

As specific examples of the aromatic polysulfone polymer, mention may be made of the widely commercially available poly(p-phenylene ether sulfone): -{(p-$C_6H_4$)-$SO_2$-(p-$C_6H_4$)-O-}$_n$-or Udel polysulfone: -{(p-$C_6H_4$)-$SO_2$-(p-$C_6H_4$)-O-(p-$C_6H_4$)-C($CH_3$)$_2$-(p-$C_6H_4$)-O}$_n$ and also polymers having the structures of -{(p-$C_6H_4$)-$SO_2$-(p-$C_6H_4$)-O-(p-$C_6H_4$)-O}$_n$-, -{(p-$C_6H_4$)-$SO_2$-(p-$C_6H_4$)-S-(p-$C_6H_4$)-O}$_n$-, -{(p-$C_6H_4$)-$SO_2$-(p-$C_6H_4$)-C-($CF_3$)-(p-$C_6H_4$)-O}$_n$, and the like in which part of the aromatic nucleus is substituted by a group of the general formula (I), for example, the 2-chloroacetamidomethyl group, 2-hydroxyacetamidomethyl group, chloride-2-trimethylammoniumacetamidomethyl group, 2-acetxyacetamidomethyl group, 2-butoxy-acetamidomethyl group, 2-methylthioacetamidomethyl group, etc.

The group of the general formula (I) is explained in more detail below. $R^1$ and $R^2$ represent a hydrogen atom or an alkyl group having preferably 1 to 4 carbon atoms, for example, a methyl group, ethyl group, propyl group, or butyl group, and may be the same or different but a polymer where $R^2$ is a hydrogen atom, in particular one in which both of $R^1$ and $R^2$ are a hydrogen atom, is the easiest to manufacture and is high in reactivity. Further, as examples of A, mention may be made of chlorine, bromine, iodine, fluorine, or other halogen atoms, a hydroxyl group, an $NH_2$ group, and also a primary amine residue such as a methylamine group, ethylamine group, n-butylamine group, or n-octylamine group, a secondary amine residual group such as a dimethylamine group, diethylamine group, di-n-butylamine group, or di-n-octylamine group, a tertiary amine residue such as a trimethylammonium group, a tri-n-butylammonium group, an N,N-dimethyl-n-hexylammonium group, an N,N-dimethyl-n-octylammonium group, an N,N-dimethyl-n-dodecylammonium group, an N,N-dimethyl-n-hexadecylammonium group, etc., a polyamine hydrocarbon residual group such as an ethylenediamine group, a hexamethylenediamine group, a decamethylenediamine group, a p-phenylenediamine group, etc., a basic polyamine acid compound residual group such as gramicidin S, polymyxin B, etc., an aminoglycoside antibiotic residual group as represented by kanamycin, streptomycin, gentamycin, etc., an acyloxyl group having 1 to 20 carbon atoms such as a formyloxyl group, acetoxyl group, propionyloxyl group, butyryloxyl group, lauroyloxyl group, oleyloxyl group, palmitoyloxyl group, stearoyloxyl group, benzoyloxyl group, p-nitrobenzoyloxyl group, etc., an alkoxyl group having 1 to 18 carbon atoms such as methoxy, ethoxy, 2-hydroxyethyloxy, 2-methoxyethyloxy, propoxy, isopropoxy, butoxy, pentyloxy, benzyloxy, etc., a phenoxyl group such as a p-nitrophenoxyl group, p-formylphenoxyl group, o-methoxy-p-formylphenoxyl group, 2-formylnaphthoxyl group, phenoxyl group, estrone residual group, etc., and a thioether residual group as represented by a methylthiol group, 2,3-dihydroxypropylthiol group, thioglucoxide group, etc. These groups may be present alone or, depending on the purpose of use, with others.

The suitable amount of the group represented by the general formula (I) in the aromatic polysulfone polymer according to the present invention differs depending on the chemical structure and application of the polymer, but usually is 0.001 to 4 groups per repeating unit. Ordinarily, polymers or articles with large amounts of the groups of the general formula (I) are used for absorption applications, while those with small amounts are used for selective separation. Those with small amounts exhibit a moldability close to that of polysulfone. Further, if the polymer is soluble, in particular, soluble in a solvent such as dimethylsulfoxide, N,N-dimethylformamide, or N,N-dimethylacetamide, wet film formation is possible, so this is particularly preferred.

Polymers where the A in the general formula (I) are halogens are high in reactivity, and therefore, are useful also as manufacturing intermediates for those with other functional groups. Further, they may be used directly for the immobilization of proteins. The reactivity of halogen atoms is high, in descending order, in iodine, bromine, chlorine, and fluorine. The properties of the polymer change depending on the amount of the haloacetamidomethyl group. Polymers or articles with a large amount of haloacetamidomethyl groups are brittle, while ones with small amounts exhibit properties close to those of the original polysulfone. Polymers having large amounts of the α-haloacetamidomethyl groups are used as polymers suitable for absorption applications, while ones with small amounts are used for immobilization. Those with small amounts are easy to be dissolved in organic solvents and also are excellent in moldability. For example, a polymer composed of Udel polysulfone in which α-chloroacetamiomethyl groups are introduced is soluble in tetrahydrofuran, chloroform, dichloromethane, etc. in addition to N,N-dimethylformamide, N,N-dimethylacetamide, dimethylsulfoxide, etc. and is excellent in film formability as well when the groups are present in an amount less than one group per repeating unit, but is insoluble in tetrahydrofuran when present in an amount of more than one group per unit and becomes insoluble even in chlorinated hydrocarbons and soluble in only N,N-dimethylformamide, N,N-dimethylacetamide, dimethylsulfoxide, etc. when present in an amount of two or more.

Further, according to the present invention, by adjusting the amount of the α-haloacetamidomethyl groups, it is possible to obtain a polymer having suitable properties, and therefore, the amount of the α-haloacetamidomethyl groups introduced should be suitably adjusted according to the object of use.

Note that the chloro group which is introduced into the polymer of the present invention or the molded article thereof can be easily transformed into an iodine group or bromine group.

Polymers where the substituent A in the general formula (I) is a hydroxyl group are improved in hydrophilicity compared with the original polysulfone polymer.

Polymers where the substituent A in the general formula (I) is an amino group have an ion exchange ability and a high absorption ability. They may be used for immobilizing bioactive substances such as heparin. The membrane thereof may be used as an affinity membrane as well. Further, an antibiotic activity can be expected. Polymyxin B is known as an antidote to endotoxin, and polymers where the A is polymyxin may be expected to have a similar action.

Polymers where the substituent A in the general formula (I) is an acyloxyl group, alkoxyl group, or sulfide group can be used as a non-ionic absorbent, a non-ionic selective separation membrane, or a non-ionic cell activation agent since the substituent A is a polar group and is not an ionic group.

Polymers where the substituent A in the general formula (I) is an aldehyde group may be used particularly conveniently for immobilization of proteins, etc. since they undergo condensation polymerization with amino groups under moderate conditions.

Polymers where the substituent A in the general formula (I) is a halogen atom can be produced by adding a mixed solution composed of a haloacetamidomethylating agent, acid catalyst, and solvent to a solution of polysulfone or else immersing a molded article of polysulfone into a mixture of a haloacetamidomethylating agent and acid catalyst or a mixed solution composed of the two and a solvent. At that time, a cross-linked polymer is obtained if para-formaldehyde is added to the reaction solution composed of the haloacetamidomethylating agent and acid catalyst or preparing the reaction solution at room temperature (since formaldehyde is produced as a by-product). The reaction is quick in speed and usually ends in 1 to 6 hours. The reaction temperature is preferably low so as to suppress secondary reactions. Usually, a temperature of 10° to 30° C. is used.

As specific examples of the haloacetamidomethylating agent usable in the present invention, mention may be made of N-methylol-α-chloroacetamide, N-methylol-α-bromacetamide, N-methylol-α-iodoacetamide, N-methylol-α-fluoroacetamide, N-methylol-α-chloropropionamide, N-methylol-α-chlorobutyrylamide, and also the methyl ethers, acetyl ethers, etc. of the same, but the invention is not limited to these. N-methylol-α-chloroacetamide, N-methylol-α-iodoacetamide, N-methylol-α-fluoracetamide, N-methylol-α-bromacetamide, etc. in particular, however, are easy to manufacture, have a high reactivity, and are easy to handle, and therefore, are preferred. The amount of usage and the amount of the haloacetamidomethyl groups introduced have a positive correlation with each other, and therefore it is preferable to adjust the amount of use in accordance with the amount of the intended introduction of haloacetamidomethyl groups.

As the acid catalyst usable in the present invention, mention may be made of Friedel-Crafts catalysts such as zinc chloride, aluminum chloride, tin tetrachloride, ferrous chloride, sulfonic acid derivatives such as benzenesulfonic acid, p-toluenesulfonic acid, methanesulfonic acid, ethanesulfonic acid, butanesulfonic acid, trifluoromethanesulfonic acid, trifluoromethanesulfonic acid trimethylsilyl ester, and sulfuric acid etc., but sulfuric acid, methanesulfonic acid, ethanesulfonic acid, butanesulfonic acid, trifluoromethanesulfonic acid, etc. are particularly preferably used since they can serve as solvents for N-methylol-α-chloroacetamide and other haloacetamidomethylating agents. As the reaction solvent, nitrobenzene is preferable when effecting a reaction in a homogeneous system. It is also possible to dissolve the polysulfone in methylenechloride, dissolve the haloacetamidomethylating agent in sulfuric acid etc., and strongly agitate the two to obtain the polymer. When treating a shaped article, a solvent for the polysulfone is not necessarily required.

Polymers where the substituent A in the general formula (I) is an amino group can be produced by bringing the aromatic polysulfone polymer, or the molded article, thereof, having haloacetamindomethyl groups into contact with a corresponding amino compound. As specific examples of the amino compounds, mention may be made of methylamine, ethylamine, n-butylamine, n-octylamine, dimethylamine, diethylamine, di-n-butylamine, di-n-octylamine, trimethylamine, triethylamine, tri-n-butylamine, N,N-dimethyl-n-hexylamine, N,N-dimethyl-n-dodecylamine, N,N-dimethyl-n-hexadecylamine, ethylene diamine, hexamethylene diamine, decamethylenediamine, gramicidin S, polymyxin B, kanamycin, streptomycin, gentamycin, etc., but the invention is not restricted to these. At this time, when the amine compound is a primary amine, secondary amino, or polyamine compound, a cross-linking reaction also occurs, and therefore, the reaction is preferably performed in the form of the shaped article.

Polymers in which the substituent A in general formula (I) is an acyloxyl group may be produced by bringing the aromatic polysulfone polymer, or its molded article, having the haloacetamidomethyl group into contact with a solution of the corresponding carboxylic acid in the presence of a base. As specific examples of the carboxylic acids, mention may be made of formic acid, acetic acid, propionic acid, butyric acid, lauric acid, oleic acid, palmitic acid, stearic acid, benzoic acid, salicylic acid, etc., but the invention is not limited to these. As the base, use may be preferably made of hydroxides, carbonates of alkali metals such as lithium, sodium, and potassium and also quaternary ammonium salts such as trimethylbenzylammonium hydroxide. When a solvent is used, use is made of dimethylsulfoxide or N,N-dimethylformamide for a homogeneous reaction. When treating a molded article by a nonhomogeneous system, use is preferably made of water or alcohol. There is no particular restriction on the temperature of the reaction, but usually 10° C. to 150° C. is used.

Polymers in which the substituent A in general formula (I) is a hydroxyl group may be produced by hydrolyzing the polymer in which the substituent A in general formula (I) is an acyloxyl group. Usually, this can be easily performed in aqueous ammonia or a solution containing sodium hydroxide.

Polymers in which the substituent A in general formula (I) is an alkoxyl group or a phenoxyl group may be produced by bringing the aromatic polysulfone polymer, or its molded article, having the haloacetamidomethyl group into contact with a corresponding hydroxyl group compound in the presence of a base. As specific examples of the hydroxyl group compounds, mention may be made of methanol, ethanol, ethyleneglycol, methylcellosolve, propanol, isopropanol, butanol, pentanol, lauryl alcohol, benzylalcohol, p-nitrophenol, p-hydroxybenzaldehyde, vanillin, 2-hydroxy-1-napthoaldehyde, phenol, estrone, estradiol, estriol, etc., but the invention is not limited to these. Further, as the base, use may be preferably made of hydrides, carbonates, or hydroxides of alkali metals such as lithium, sodium, and potassium and also quaternary ammonium salts such as trimethylbenzylammonium hydroxide. When a solvent is used, use is made of dimethylsulfoxide or N,N-dimethylformamide for a homogeneous reaction. When treating a molded article by a nonhomogeneous system, use is preferably made of water or alcohol. There is no particular restriction on the temperature of the reaction, but usually 10° C. to 100° C. is used.

Polymers in which the substituent A in general formula (I) is a sulfide group may be produced by bringing the aromatic polysulfone polymer, and its molded article, having the haloacetamidomethyl group into contact with a corresponding thiol compound in the presence of a base. As specific examples of the thiol compounds, mention may be made of methylmercaptan, 2,3-dihydroxypropylthiol, 1-thio-$\beta$-D-glucose, 6-mercaptopurine, etc., but the invention is not limited to these. Further, as the base, use may be preferably made of hydrides, carbonates, or hydroxides of alkali metals such as lithium, sodium, and potassium and also trimethylbenzylammonium hydroxide and other quaternary ammonium salts. In the case of use of a solvent, use is made of dimethylsulfoxide or N,N-dimethylformamide for a homogeneous reaction. When treating a molded article by a nonhomogeneous system, use is preferably made of water or alcohol. There is no particular restriction on the temperature of the reaction, but usually 0° C. to 100° C. is used.

Molded articles composed of the aromatic polysulfone of the present invention may be produced by molding the aromatic polysulfone polymer to which side chains have been introduced into suitable forms such as fibers or membranes by suitable methods or be produced by introducing side chains into molded articles of suitable forms composed of main chains of aromatic polysulfone.

EXAMPLES

The present invention will now be explained in further detail by Examples, but is not limited to these Examples.

Note that the methods used for the evaluation in the Examples were as follows:

1. Infrared absorption spectrum

Use was made of a Shimadzu Fourier Transform Infrared Spectrophotometer FTIR-4300 to measure specimens shaped into films or KBr tablets.

2. Ion exchange capacity (measurement of amount of amine groups)

The polymer was finely pulverized and packed into a column in an amount of 0.1 to 1 g. A 5% amount of diisopropylethylamine-methanol was passed through this to regenerate it. Methanol, a 0.1M picric acid-methanol solution, and methanol were successively passed through it, then a 0.1M diisopropylethylamine-methanol solution was passed and the absorption of the eluent (360 m$\mu$) was measured to find the amounts of the primary to tertiary amine groups.

The amount of the quaternary ammonium groups was found by successively passing an aqueous 0.1N caustic soda solution, water, and 1M saline solution through a column packed with the polymer and titrating the amount of alkali eluting from it.

Example 1

A mixed solution of 100 ml of nitrobenzene and 200 ml of sulfuric acid was cooled to 0° C. A 20.0 g amount of N-methylol-$\alpha$-chloroacetamide was added to this and dissolved at 0° to 10° C. to prepare an amidomethylating solution.

To a solution of 5.0 g of Udel polysulfone (P3500, Union Carbide Co.) dissolved in 50 ml of nitrobenzene was added 10, 20, 45, 90, or 136 ml amounts of the above-mentioned amidomethylating solution heated in temperature to 10° C. The mixture was agitated at 15° C. for 2 hours. The reaction solution was poured into ice water and the precipitated polymer was washed with methanol and then dried to obtain the polymer of Table 1. The polymer exhibited a strong absorption of an amide group at 1672 cm$^{-1}$ (amide-I) and 3362 cm$^{-1}$ (N—H) in the infrared absorption spectrum, so the structure was confirmed.

TABLE 1

| Example | Amount of amido-methylating solution (ml) | Rate of increase of weight (%) | Elemental analysis (%) | | |
|---|---|---|---|---|---|
| | | | Nitrogen | Chlorine | Sulfur |
| 1-1 | 10 | 11.6 | 1.62 | 3.11 | 6.42 |
| 1-2 | 20 | 19.0 | 2.60 | 5.61 | 5.99 |
| 1-3 | 30 | 26.5 | 3.43 | 8.15 | 5.47 |
| 1-4 | 45 | 65.6 | 4.65 | 9.58 | 5.76 |
| 1-5 | 90 | 84.4 | 6.10 | 12.62 | 4.72 |
| 1-6 | 136 | 89.2 | 6.14 | 14.06 | 4.44 |

Regarding the solubility of the obtained polymers, the polymers of Examples 1-1 and 1-2 were soluble in N,N-dimethylformamide, N,N-dimethylacetamide, dimethylsulfoxide, etc. and also tetrahydrofuran, chloroform, dichloromethane, etc. and excellent films could be obtained from these solvents. The polymers of Examples 1-3 and 1-4 were insoluble in tetrahydrofuran, and the polymers of Examples 1-5 and 1-6 were insoluble in tetrahydrofuran, chloroform, and dichloromethane, but dissolved in N,N-dimethylformamide, N,N-dimethylacetamide, and dimethylsulfoxide. The polymer of Example 1-3 gave an excellent film from methylenechloride.

Example 2

To a solution of 3.2 g of poly(p-phenylenesulfone) (Scientific Polymer Products Institute, New York, U.S.A.) dissolved in 100 ml of nitrobenzene was added 70 ml of the amidomethylating solution of Example 1 raised in temperature to 10° C. The mixture was agitated at 25° C. for 2 hours. The reaction solution was poured into ice water and the precipitated polymer was washed with methanol and then dried to obtain 3.6 g of a polymer. Elemental analysis revealed this comprised 57.30% carbon, 3.70% hydrogen, 1.96% nitrogen, 4.01% chlorine, and 11.74% sulfur. The polymer exhibited a strong absorption of an amide group at 1674 cm$^{-1}$ (amide-I) in the infrared absorption spectrum, so the structure was confirmed.

The resulting polymer formed a soft film from N,N-dimethylformamide.

Example 3

A mixed solution of 20 ml of nitrobenzene, 31 ml of methanesulfonic acid, and 9 ml of ethanesulfonic acid was cooled to 0° C. A 10.0 g amount of N-methylol-α-chloroacetoamide was added to this and dissolved at 0° C. to prepare an amidomethylating solution.

To a solution of 5.0 g of Udel polysulfone (P3500) dissolved in 50 ml of nitrobenzene was added the above-mentioned amidomethylating solution heated to a temperature of 6° C. with strong agitation. The mixture was agitated at 25° C. for 2 hours. The reaction solution was poured into 5 liters of −20° C. methanol and the precipitated polymer was washed with methanol and then dried to obtain 7.4 g of chloroacetamidomethylated polysulfone. Elemental analysis revealed 59.8% of carbon, 4.8% of hydrogen, 4.8% of nitrogen, 9.6% of chlorine, and 5.1% of sulfur. The polymer exhibited a strong absorption of an amide group at 1672 cm$^{-1}$ (amide-I) and 3362 cm$^{-1}$ (N—H) in the infrared absorption spectrum, so the structure was confirmed. The resulting polymer formed a soft film from N,N-dimethylformamide.

Example 4

A mixed solution of 114 ml of nitrobenzene and 227 ml of sulfuric acid was cooled to 0° C. A 22.7 g amount of N,N-methylol-α-chloroacetamide was added and dissolved at 0° C. to 10° C. to prepare an amidomethylating solution.

To a solution of 50 g of Udel polysulfone (P3500) dissolved in 500 ml of nitrobenzene was added the above-mentioned amidomethylating solution heated to a temperature of 10° C. with strong agitation. The mixture was agitated at 15° C. for 2 hours. The reaction solution was poured into 5 liters of −20° C. methanol and the precipitated polymer was washed with methanol and then dried to obtain 64.4 g of chloroacetamidomethylated polysulfone. The polymer exhibited a strong absorption of an amide group at 1672 cm$^{-1}$ (amide-I) and 3362 cm$^{-1}$ (N—H) in the infrared absorption spectrum, so the structure was confirmed.

A 5.0 g amount of the resulting polymer was dissolved in 150 ml of dimethylsulfoxide. To this was added 50 ml of triethylamine. The mixture was heated at 100° C. for 2 hours, then was poured into ethyl acetate. A 5.5 g amount of triethylammoniumacetamidomethylated polysulfone was obtained. An infrared absorption spectrum showed absorption at 1678 cm$^{-1}$ (amide-I) and 3170-3176, 3420-3435 cm$^{-1}$ (N—H). The polymer was insoluble in methylene chloride, but soluble in methanol and hot water. A tough film was obtained from a N,N-dimethylformamide solution. The ion exchange capacity was 2.5 milliequivalents/g.

Example 5

A mixed solution of 19 ml of nitrobenzene and 38 ml of sulfuric acid was cooled to 0° C. A 3.75 g amount of N,N-methylol-α-chloroacetamide was added and dissolved at 0° to 10° C. to prepare an amidomethylating solution.

To a solution of 30 g of Udel polysulfone (P3500) dissolved in 300 ml of nitrobenzene was added the above-mentioned amidomethylating solution raised in temperature to 10° C. with strong agitation. The mixture was agitated at 15° C. for 2 hours. The reaction solution was poured into 3 liters of −20° C. methanol and the precipitated polymer was washed with methanol and then dried to obtain 32.9 g of chloroacetamidomethylated polysulfone. The polymer, like as in Example 2, exhibited absorption of an amide group at 1676 cm$^{-1}$ (amide-I) and 3367 cm$^{-1}$ (N—H) in the infrared absorption spectrum. Also, elemental analysis revealed 1.60% of nitrogen.

A 2.0 g amount of the chloroacetamidomethylated polysulfone was dissolved in 30 ml of dimethylsulfoxide. To this was added 10 ml of triethylamine. The mixture was heated at 100° C. for 2 hours. It was then concentrated under reduced pressure, then was poured into ethyl acetate. A 2.2 g amount of triethylammoniumacetoamidomethylated polysulfone was obtained. The polymer dissolved well in methylene chloride. A tough film was obtained from the solution. The ion exchange capacity was 1.02 milliequivalents/g.

Example 6

A 2.0 g amount of the chloroacetamidomethylated polysulfone polymer obtained in Example 5 was dissolved in 60 ml of N,N-dimethylformamide. To this was added 12 ml of N,N-dimethyloctylamine. This was heated at 100° C. for 2 hours, and then was poured into ethyl acetate. A 2.4 g amount of dimethyloctylammonium acetamidomethylated polysulfone was obtained. A tough film was obtained from a methylene chloride solution of the polymer. An infrared absorption spectrum revealed an increase in the absorption at 3200 cm$^{-1}$ (N—H) and 739 cm$^{-1}$. The amount of ion exchange capacity was 0.87 milliequivalents/g.

Example 7

A 2.0 g amount of the chloroacetamido methylated polysulfone polymer obtained in Example 5 was dissolved in 60 ml of N,N-dimethylformamide. To this was added 12 ml of N-dimethyldodecylamine. This was heated at 100° C. for 2 hours, then was poured into ethyl acetate. A 2.4 g amount of dimethyldodecylammonium acetamido methylated polysulfone was obtained. A tough film was obtained from a methylene chloride solution of this polymer. An infrared absorption spectrum revealed in increase in the absorption at 3206 cm$^{-1}$ (N—H), 2926 cm$^{-1}$ (CH$_2$), and 739 cm$^{-1}$ and 567 cm$^{-1}$. The ion exchange capacity was 0.84 milliequivalents/g.

Example 8

A 2.0 g amount of the chloroacetamido methylated polysulfone polymer obtained in Example 5 was dissolved in 60 ml of N,N-dimethylformamide. To this was added 12 ml of N-dimethylhexadecylamine. This was heated at 100° C. for 2 hours, then was poured into ethyl acetate. A 2.5 g amount of dimethylhexadecylammonium acetamido methylated polysulfone was obtained. A tough film was obtained from a methylene chloride solution of this polymer. An infrared absorption spectrum revealed in increase in the absorption at 3203 cm$^{-1}$ (N—H) and 2926 cm$^{-1}$ (CH$_2$) and revealed a shift from the 1676 cm$^{-1}$ of the absorption of the amide group to 1680 cm$^{-1}$. The ion exchange capacity was 0.65 milliequivalents/g.

Example 9

To a solution of 1 g of polymyxin B-sulfate dissolved in 50 ml of dimethylsulfoxide was added 1.6 ml of a 2N aqueous caustic soda solution to prepare a polymyxin B solution. On the other hand, 2.0 g of the chloroacetamidomethylated polysulfone polymer obtained in Example 5 was dissolved in 50 ml of dimethyl sulfoxide. To this was added the polymyxin B solution. The mixture was agitated at room temperature for 24 hours. After this, the reaction mixture was added to 1 liter of water, the resulting precipitate was filtered and dried, and thereby 2.3 g of polymyxin B immobilized polysulfone was obtained. This had 0.73 milliequivalents/g of amine groups, and therefore it was learned that 0.14 mmol of polymyxin B is immobilized per 1 g of the polymer.

Example 10

To a solution of 1 g of gramicidin S-chloride dissolved in 50 ml of dimethylsulfoxide was added 1.0 ml of an aqueous solution of 2N caustic soda to prepare a gramicidin S solution. On the other hand, 2.0 g of the chloroacetamidomethylated polysulfone polymer obtained in Example 5 was dissolved in 50 ml of dimethyl sulfoxide. To this was added the gramicidin S solution. The mixture was agitated at room temperature for 24 hours. After this, the reaction mixture was added to 1 liter of ethanol, the resultant precipitate was filtered and dried, and thereby 2.0 g of gramicidin S immobilized polysulfone was obtained. This had 0.34 milliequivalents/g of amino groups, so it was learned that 0.17 mmol of gramicidin S is immobilized per 1 g of the polymer.

Example 11

A mixed solution of 74 ml of nitrobenzene and 149 ml of sulfuric acid was cooled to 0° C. A 14.9 g amount of N,N-methylol-α-chloroacetamide was added and dissolved at 0° C. to 10° C. to prepare an amidomethylating solution.

To a solution of 60 g of Udel polysulfone (P3500) dissolved in 600 ml of nitrobenzene was added the above-mentioned amidomethylating solution heated to a temperature of 10° C. with strong agitation. The mixture was agitated at 15° C. for 2 hours. The reaction solution was poured into 3 liters of −20° C. methanol and the precipitated polymer was washed with methanol and then dried to obtain 72 g of chloroacetamidomethylated polysulfone. The polymer exhibited absorption of an amide group at 1676 cm$^{-1}$ and 3367 cm$^{-1}$ in the infrared absorption spectrum. Elemental analysis revealed 2.60% of nitrogen.

A 4.0 g amount of the chloroacetamidomethylated polysulfone was dissolved in 100 ml of N,N-dimethylacetamide. To this was added 2 ml of 50% lithium acetate water. The mixture was heated at 100° C. for 2 hours. This was poured into water, and then 3.5 g of 2-acetoxyacetamidomethylated polysulfone was obtained. This polymer dissolved well in chloroform and a tough film was obtained from this solution. The polymer exhibited an absorption of ester groups at 1753 cm$^{-1}$ and 1250 cm$^{-1}$ in the infrared absorption spectrum, so the structure was confirmed.

Example 12

A 4.0 g amount of the chloroacetamidomethylated polysulfone polymer obtained in Example 11 was dissolved in 100 ml of N,N-dimethylacetamide. To this was added 3.2 g of lauric acid. To this solution was added 0.2 ml of an aqueous 35% caustic soda. This was agitated at room temperature overnight, then was heated at 100° C. for 1 hour. The mixture was poured into ethanol, whereby 5.0 g of 2-lauroyloxyacetamidomethylated polysulfone was obtained. A tough film was obtained from an N,N-dimethylformamide solution of this polymer. This polymer exhibited absorption of ester groups at 1743 cm$^{-1}$ and 1244 cm$^{-1}$ in the infrared absorption spectrum, so its structure was confirmed.

Example 13

A mixed solution of 100 ml of nitrobenzene and 200 ml of sulfuric acid was cooled to 0° C. A 30 g amount of N-methylol-α-chloroacetamide was added and dissolved at 0° C.–10° C. to prepare an amidomethylating solution.

To a solution of 240 g of Udel polysulfone (P3500) dissolved in 1200 ml of nitrobenzene was added the above-mentioned amidomethylating solution heated to a temperature of 10° C. with strong agitation. The mixture was agitated at 15° C. for 2 hours. The reaction solution was poured into 5 liters of −20° C. methanol and the precipitated polymer was washed with methanol and then dried to obtain 293 g of chloroacetamidomethylated polysulfone. The polymer exhibited strong absorption of an amide group at 1672 cm$^{-1}$ (amido-I) and 3362 cm$^{-1}$ (N—H) in the infrared absorption spectrum. Elemental analysis revealed 1.17 percent of nitrogen. The structure was thereby confirmed.

A 4.0 g amount of the chloroacetamidomethylated polysulfone was dissolved in 100 ml of N,N-dimethylacetamide. To this was added 2 ml of 50% lithium acetate water. The mixture was heated at 100° C. for 2 hours. This was poured into methanol, then 3.5 g of 2-acetoxyacetamidomethylated polysulfone was obtained. This polymer dissolved well in chloroform and a tough film was obtained from this solution. The polymer exhibited an absorption of ester groups at 1753 cm$^{-1}$ and 1250 cm$^{-1}$ in the infrared absorption spectrum, so the structure was confirmed.

Example 14

A mixed solution of 570 ml of nitrobenzene and 1135 ml of sulfuric acid was cooled to 0° C. A 113.5 g amount of N-methylol-α-chloroacetamide was added and dissolved at 0° C.–5° C. to prepare an amidomethylating solution.

To a solution of 250 g of Udel polysulfone (P3500) dissolved in 2500 ml of nitrobenzene was added the above-mentioned amidomethylating solution raised in temperature to 10° C. with strong agitation. The mixture was agitated at 15° C. for 2 hours. The reaction solution was poured into 10 liters of −20° C. methanol and the precipitated polymer was washed with methanol and then dried to obtain 260 g of chloroacetamidomethylated polysulfone. The polymer exhibited absorption of an amide group at 1676 cm$^{-1}$ and 3367 cm$^{-1}$ in the infrared absorption spectrum. Element analysis revealed 3.50% of nitrogen, 8.2% of chlorine, and 5.9% of sulfur. 1.3 moles of amide groups were introduced per repeating unit of the polymer.

A 4.0 g amount of the chloroacetamidomethylated polysulfone was dissolved in 200 ml of N,N-dimethylformamide. To this was added 50 ml of 28% sodium methoxide-methanol solution. The mixture was heated at 25° C. for 90 minutes, then was poured into water, whereby 3.6 g of 2-methoxyacetamidomethylated polysulfone was obtained. A tough film was obtained from an N,N-dimethylformamide solution of this polymer. The polymer exhibited absorption at 1680, 1585, 1524, 1489, 1321, 1296, 1245, 1150, 1109, 854, 836, 690, and 571 cm$^{-1}$ in the infrared absorption spectrum and also a reduction of absorption of the C—Cl group of 737 cm$^{-1}$, so its structure was confirmed.

Example 15

A 5.0 g amount of the chloroacetamidomethylated polysulfone polymer obtained in Example 14 was dissolved in 100 ml of N,N-dimethylacetamide. To this was added 5 g of p-nitrophenol sodium-2 hydride. This was agitated at room temperature for 5 hours. The mixture was poured into methanol, whereby 5.4 g of 2-(p-nitrophenoxy)acetamidemethylated polysulfone was obtained. A tough film was obtained from an N,N-dimethylformamide solution of this polymer. This polymer exhibited new absorption at 1607, 1607, 1387 cm$^{-1}$ and 1342 cm$^{-1}$ in the infrared absorption spectrum, so its structure was confirmed.

Example 16

A 5.0 g amount of the chloroacetamidomethylated polysulfone polymer obtained in Example 14 was dissolved in 100 ml of dimethylsulfoxide. To this was added 10 g of estrone. Further, 2.4 g of tetramethylammonium hydroxide-5 hydride was added. The mixture was agitated at room temperature for 18 hours. The mixture was poured into methanol. The refined precipitate was washed with acetone, whereby 7.5 g of acetamidomethylated polysulfone having estrone residual groups was obtained. This polymer was soluble in chloroform and exhibited strong absorption by ketone at 1740 cm$^{-1}$ in an infrared absorption spectrum.

Example 17

A 4.0 g amount of the chloroacetamidomethylated polysulfone polymer obtained in Example 14 was dissolved in 100 ml of dimethylsulfoxide. To this was added 4 g of p-hydroxybenzaldehyde to dissolve the same. Further, 8 ml of an aqueous solution of 40% tetrabutylammonium hydroxide was added. The mixture was agitated at room temperature for 20 hours. The mixture was then poured into methanol, whereby 2.8 g of 2-(p-formylphenoxy) acetamidemethylated polysulfone was obtained. A tough film was obtained from an N,N-dimethylformaide solution of this polymer. The polymer exhibited an extremely strong absorption at 754 cm$^{-1}$ in an infrared absorption spectrum.

To confirm the structure, 0.2 g of the polymer was dissolved in 30 ml of N,N-dimethylacetamide. To this was added 270 mg of 2,4-dinitrophenylhydradine and 2 ml of hydrochloric acid. The mixture was agitated for 24 hours, then was made to precipitate by methanol to obtain 0.19 g of a reddish orange polymer. This exhibited an absorption maximum of 4.1 (55 mg/dl) at 400 mµ in N,N-dimethylacetamide.

Example 18

A 4.0 g amount of the chloroacetamidomethylated polysulfone polymer obtained in Example 14 was dissolved in 100 ml of dimethylsulfoxide. To this was added 4 g of vanillin. Further, 8 ml of an aqueous solution of 40 percent hydroxylated tetrabutylammonium was added. This was agitated at room temperature for 20 hours. The mixture was poured into methanol, whereby 2.8 g of 2-(o-methoxy-p-formylphenoxy)acetamidemethylated polysulfone was obtained. A tough film was obtained from an N,N-dimethylformamide solution of this polymer.

To confirm the structure, 0.2 g of the polymer was dissolved in 30 ml of N,N-dimethylacetamide. To this was added 270 mg of 2,4-dinitrophenylhydrazine and 2 ml of hydrochloric acid. This was agitated for 24 hours, then made to precipitate with methanol to obtain 0.17 g of a reddish orange polymer. This exhibited an absorption maximum of 4.9 (46 mg/dl) with 402 mµ in N,N-dimethylacetamide.

Example 19

A 4.0 g amount of the chloracetamidomethylated polysulfone polymer obtained in Example 14 was dissolved in 100 ml of dimethylsulfoxide. To this was added 8 g of 2-hydroxy-1-napthoaldehyde. Further, 2.4 g of tetramethylammonium hydroxide-5 hydride was added. This was agitated at room temperature for 18 hours. The mixture was poured into methanol, whereby 3.8 g of a polymer having napthoaldehyde residual groups was obtained.

To confirm the structure, 0.3 g of the polymer was dissolved in 30 ml of N,N-dimethylacetamide. To this was added 270 mg of 2,4-dinitrophenylhydrazine and 2 ml of hydrochloric acid. This was agitated for 24 hours, then made to precipitate with methanol to obtain 0.25 g of a reddish orange polymer. This exhibited an absorption maximum of 1.1 (45 mg/dl) with 412 mµ in N,N-dimethylacetamide.

Example 20

A 4.0 g amount of the chloroacetamidomethylated polysulfone polymer obtained in Example 14 was dissolved in 100 ml of dimethylsulfoxide. To this was added 8 ml of 1-thioglycerol. Further, 2 g of tetramethylammonium hydroxide-5 hydride was added. This was agitated at room temperature for 20 hours. The mixture was poured into methanol, whereby 3.6 g of 2-(2,3-dihydroxypropylthio)acetamidomethylated polysulfone was obtained. This polymer did not dissolve in chloroform, but dissolved in N,N-dimethylformamide. A tough film was obtained from this latter solution. The polymer exhibited an extremely strong absorption of a hydroxyl group at 3345 cm$^{-1}$ and an amide group at 1655 cm$^{-1}$ in an infrared absorption spectrum, so its structure was confirmed.

Example 21

A 2.0 g amount of the chloroacetamidomethylated polysulfone polymer obtained in Example 14 was dissolved in 80 ml of dimethylsulfoxide. To this was added 2 g of 6-mercaptopurine. Further, 1 g of tetramethylammonium hydroxide-5 hydride was added. This was agitated at room temperature for 20 hours. The mixture was poured into methanol, whereby 2.3 g of an acetamidomethylated polysulfone powder with thioether bonded 6-mercaptopurine residual groups was obtained. The polymer exhibited new absorption at 3050 to 3300 cm$^{-1}$, 1568, 1387, 920, and 642 cm$^{-1}$ in an infrared absorption spectrum, so its structure was confirmed.

Example 22

A 4.0 g amount of the chloroacetamidomethylated polysulfone polymer obtained in Example 14 was dissolved in 80 ml of dimethylsulfoxide. To this was added a solution of 4 g of a sodium salt of 1-thio-β-D-glucose dissolved in 20 ml of dimethylsulfoxide. This was agitated at room temperature for 18 hours. The mixture was poured into methanol, whereby 3.3 g of a powder of acetamidomethylated polysulfone having thioether bonded 1-thio-β-D-glucose was obtained. A flexible film was obtained from a N,N-dimethylformamide solution of this. The polymer exhibited an extremely strong absorption of a hydroxyl group at 3350 cm$^{-1}$ and an amide group at 1659 cm$^{-1}$ in an infrared absorption spectrum.

INDUSTRIAL APPLICABILITY

As mentioned in detail above, the present invention has as its greatest feature the provision of a soluble, novel aromatic polysulfone polymer, or a molded article of the same, having superior characteristics by the introduction of a specific α-haloacetamidemethyl group as a side chain to a main chain of an aromatic polysulfone. The aromatic polysulfone polymer obtained by the present invention is useful as a material for the absorption, separation, immobilization, etc. of ionic substances, bioactive substances, etc.

The aromatic polysulfone polymer and molded article of the present invention can be suitably used in the form of dishes, bottles, films, fibers, hollow fibers, granules, or molded articles of combinations of the same for materials for affinity chromatrography adsorbents, therapeutic blood treatment agents, antibiotic materials, etc. Further, the polymer and molded article sum of the present invention may be used for applications as cell culturing equipment, artificial organs, artificial blood vessels, catheters, and the like in addition to the filtration, separation, and condensation of various substances and the immobilization of substances. The substances which can be immobilized include albumin, antibody proteins, enzymes, growth factors (hemangioendo growth factors, fibroblast growth factors, etc.), amino acids, peptides, and polysaccharides.

We claim:

1. An aromatic polysulfone polymer having an aromatic nucleus to which is introduced a group represented by the following formula (I)

$$A-CH(R^1)-CO-N(R^2)-CH_2- \quad (I)$$

wherein, A is a halogen atom, hydroxyl group, amino compound residual group, acyloxyl group, alkoxyl group, phenoxyl group, or sulfide group, $R^1$ and $R^2$ are a hydrogen atom or lower alkyl group, and $R^1$ and $R^2$ may be the same or different to a main chain of aromatic polysulfone, as a side chain.

2. A polymer as claimed in claim 1, wherein the aromatic polysulfone is a poly(p-phenylene ether sulfone).

3. A polymer as claimed in claim 1, wherein the aromatic polysulfone contains the repeating unit: -{(p-$C_6H_4$)-$SO_2$-(p-$C_6H_4$)-O-(p-$C_6H_4$)-C($CH_3$)$_2$-(p-$C_6H_4$)-O}$_n$.

4. A polymer as claimed in claim 1, wherein the side chain substituent group A is a cyclic polypeptide having two or more amine groups.

5. A polymer as claimed in claim 1, wherein the side chain substituent group A is a group having a steroid skeleton.

6. A polymer as claimed in claim 1, wherein the side chain substituent group A is a group having an aldehyde group.

7. A polymer as claimed in claim 1, wherein the aromatic polysulfone compound having a side chain thereto introduced is soluble.

8. A molded article composed of the polymer according to claim 1.

9. A molded article as claimed in claim 8, wherein the shape of the molded article is a dish, bottle, membrane, fiber, hollow fiber, granules, or combination products thereof.

* * * * *

UNITED STATES PATENT AND TRADEMARK OFFICE
CERTIFICATE OF CORRECTION

PATENT NO. : 5,451,438
DATED : September 19, 1995
INVENTOR(S) : Kazuo Teramoto et al It is certified that error appears in the above-indentified patent and that said Letters Patent is hereby corrected as shown below:

In Column 3, Line 39, after "$C_6H_4)-C-(CF_3)$" insert -- $-(p-C_6H_4)-O$ --

Signed and Sealed this

Thirtieth Day of January, 1996

Attest:

BRUCE LEHMAN

Attesting Officer

Commissioner of Patents and Trademarks